(12) United States Patent
Aoki (10) Patent No.: US 9,834,087 B2
(45) Date of Patent: Dec. 5, 2017

(54) VEHICLE STRUCTURE

(71) Applicant: HONDA MOTOR CO., LTD., Tokyo (JP)

(72) Inventor: Masato Aoki, Wako (JP)

(73) Assignee: HONDA MOTOR CO., LTD., Tokyo (JP)

(\*) Notice: Subject to any disclaimer, the term of this patent is extended or adjusted under 35 U.S.C. 154(b) by 0 days.

(21) Appl. No.: 15/172,154

(22) Filed: Jun. 3, 2016

(65) Prior Publication Data

US 2016/0368364 A1    Dec. 22, 2016

(30) Foreign Application Priority Data

Jun. 18, 2015  (JP) ................................ 2015-122624

(51) Int. Cl.
| | |
|---|---|
| *B60N 99/00* | (2006.01) |
| *B60K 11/08* | (2006.01) |
| *G10K 9/22* | (2006.01) |
| *B60C 5/00* | (2006.01) |

(52) U.S. Cl.
CPC ................ *B60K 11/08* (2013.01); *G10K 9/22* (2013.01); *B60C 5/00* (2013.01)

(58) Field of Classification Search
CPC ............. B60K 11/08; G10K 9/22; B60Q 5/00
See application file for complete search history.

(56) References Cited

U.S. PATENT DOCUMENTS

| | | | | |
|---|---|---|---|---|
| 5,052,284 A | * | 10/1991 | Schweikert | F24F 13/06 454/292 |
| 6,540,037 B2 | * | 4/2003 | Sasano | B62D 25/084 180/68.1 |
| 2007/0243818 A1 | * | 10/2007 | Clarke | B60K 11/08 454/320 |

FOREIGN PATENT DOCUMENTS

JP    2010-163075    7/2010

\* cited by examiner

*Primary Examiner* — Lori L Lyjak
(74) *Attorney, Agent, or Firm* — Mori & Ward, LLP (57) ABSTRACT

A vehicle structure includes a cooling device, an air guide member, and a horn. The cooling device is cooled with a flow of moving air which a vehicle receives while traveling. The air guide member guides the moving air into the cooling device. The air guide member has a single opening in a front of the vehicle. The horn is disposed at a side of the air guide member. The cooling device and the horn are arranged in a vehicle-width direction. The cooling device and the horn face the single opening viewed form the front of the vehicle.

12 Claims, 12 Drawing Sheets

VEHICLE STRUCTURE

CROSS-REFERENCE TO RELATED APPLICATIONS

The present application claims priority under 35 U.S.C. §119 to Japanese Patent Application No. 2015-122624, filed Jun. 18, 2015, entitled "Vehicle Structure." The contents of this application are incorporated herein by reference in their entirety.

BACKGROUND

1. Field

The present disclosure relates to a vehicle structure.

2. Description of the Related Art

For example, Japanese Unexamined Patent Application Publication No. 2010-163075 discloses a structure in which a radiator grille is disposed in front of a radiator of a vehicle and a horn is disposed in an opening formed in the radiator grille.

SUMMARY

According to one aspect of the present invention, a vehicle structure includes a cooling device, an air guide member, and a horn. The cooling device is cooled by a flow of moving air which a vehicle receives while traveling. The air guide member guides the moving air into the cooling device. The horn is disposed at the side of the air guide member. The cooling device and the horn are juxtaposed in the vehicle-width direction. The air guide member has a single opening in the front of the vehicle. The opening spans from the cooling device to the horn.

According to another aspect of the present invention, a vehicle structure includes a cooling device, an air guide member, and a horn. The cooling device is cooled with a flow of moving air which a vehicle receives while traveling. The air guide member guides the moving air into the cooling device. The air guide member has a single opening in a front of the vehicle. The horn is disposed at a side of the air guide member. The cooling device and the horn are arranged in a vehicle-width direction. The cooling device and the horn face the single opening viewed form the front of the vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

An embodiment of the present application will be described in detail below with reference to the attached drawings. In this description, references to "front", "rear", "right", "left", "top", and "bottom" of a vehicle are relative to the position at the driver while in the driver's seat, while "front-to-rear direction" refers to the longitudinal direction, "right-to-left direction" refers to the vehicle-width direction, and "top-to-bottom direction" refers to the vertical direction.

Figure 1:
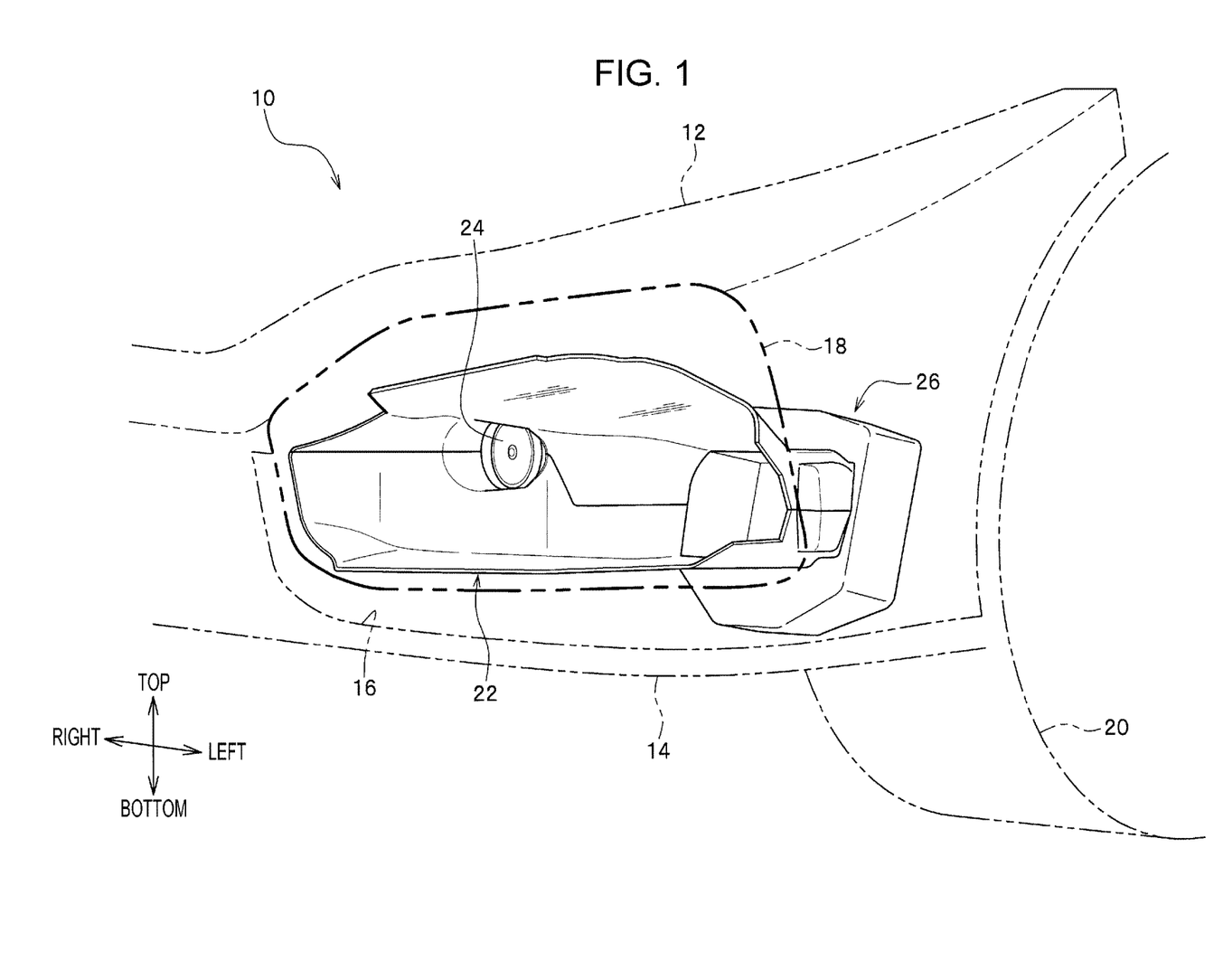
FIG. 1 is a schematic diagram of a left front portion of a vehicle that employs a vehicle structure according to a first embodiment of the present application.

As shown in FIG. 1, a vehicle 10 includes a front bumper 12 that is provided on a front end of the vehicle 10 so as to extend in the vehicle-width direction, a front grille 14 mounted under the front bumper 12, and a mesh 18 that is mounted in a bumper opening 16 (see FIG. 7) formed in the front bumper 12 and that has a plurality of holes (not illustrated). The reference number 20 in FIG. 1 shows a left front wheel disposed on the left front side of the vehicle 10 so as to be located behind the front bumper 12. In addition, the reference number 21 in FIG. 7 to be described later shows an inner fender that covers part of the left front wheel. Furthermore, the mesh 18 of FIG. 1 is shown in a perspective view, omitting the detailed illustration of the mesh design of the mesh 18.

Figure 2:
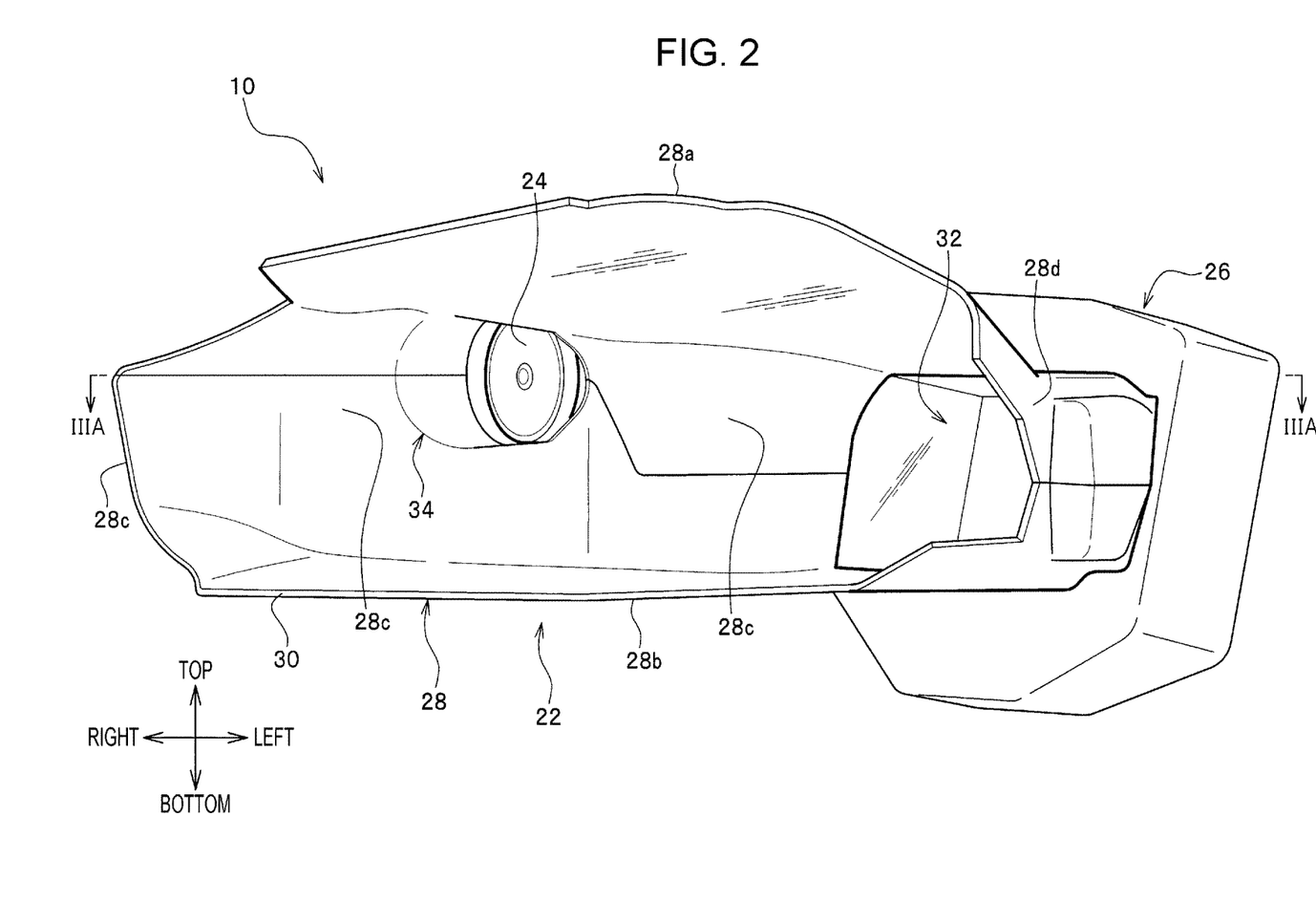
FIG. 2 is a perspective view of the left front portion of FIG. 1 from which illustrations of a front bumper and a mesh are removed.

As shown in FIGS. 1 and 2, an air guide duct (air guide member) 22 that, when the vehicle 10 is traveling, guides moving air into an intercooler 26 to be described later, a single horn 24 (see FIGS. 3A and 3B) that is mounted in the right side face of the air guide duct 22 when seen in plan view, and the intercooler (cooling device) 26 that is cooled by the moving air are disposed behind the mesh 18 in this order from the vehicle front toward the rear. The inner fender 21 that covers part of the left front wheel 20 is provided behind the intercooler 26 (see FIG. 7 to be described later).

Figures 3A, 3B:
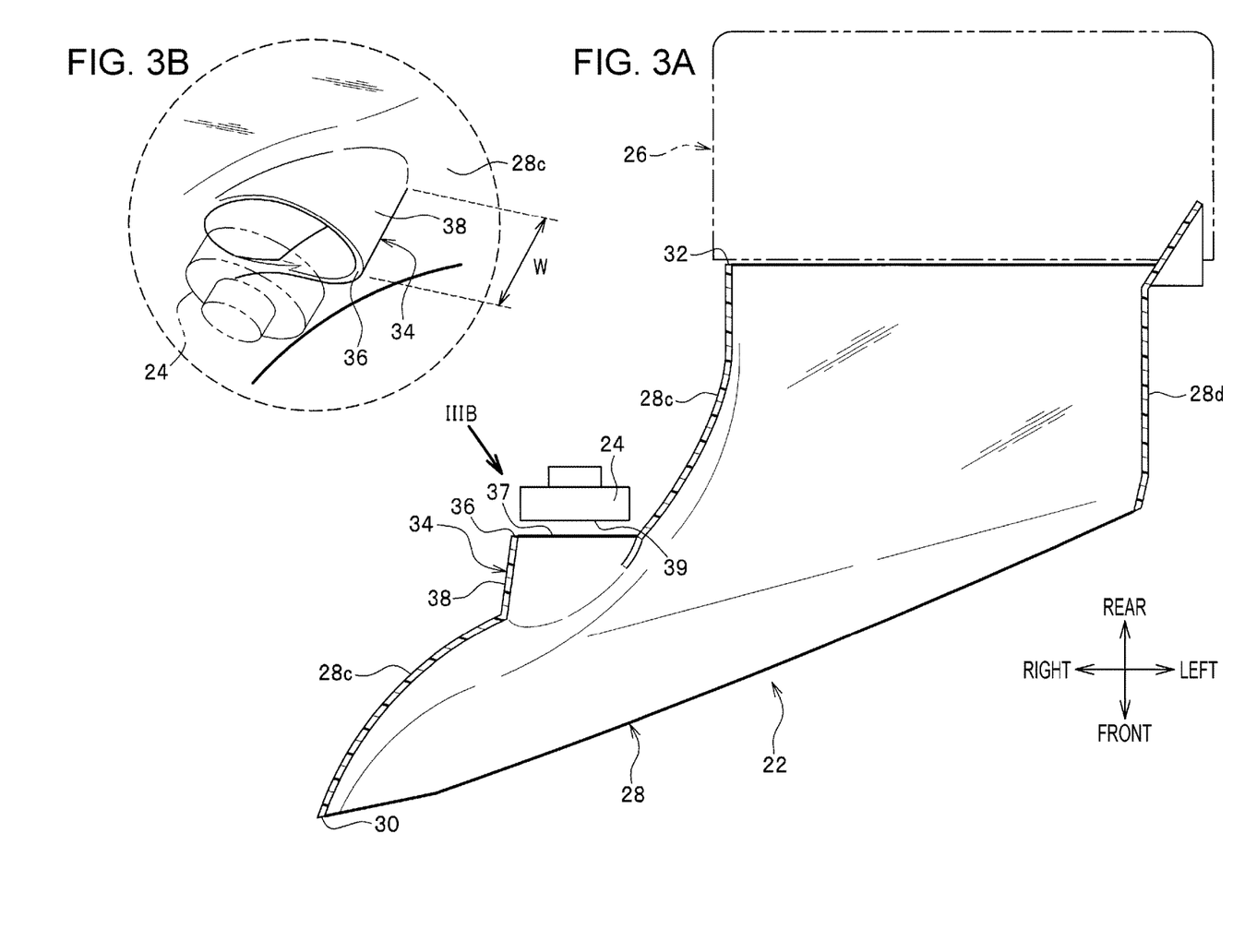
FIG. 3A is a transverse sectional view taken along line IIIA-IIIA of FIG. 2.
FIG. 3B is a view as seen from an arrow "IIIB" of FIG. 3A.

As shown in FIG. 2, the air guide duct 22 has an integrally molded duct body 28 made of, for example, a resin material. The duct body 28 as a whole has a substantially rectangular vertical section along the vehicle-width direction and gradually increases in diameter from an outlet 32 (to be described later) located at a rear end thereof toward the vehicle front. In addition, the duct body 28 consists of an upper wall 28a, a lower wall 28b opposing the upper wall 28a, a right wall 28c located on the inboard side when seen from the vehicle front, and a left wall 28d located on the outboard side when seen from the front. The duct body 28 has a single opening 30 formed in a front end thereof and the outlet 32 that is formed at the rear end thereof so as to have a reduced diameter compared to the opening 30 in the vicinity of the intercooler 26 (see FIG. 3A). As shown in FIG. 3A, the right wall 28c performs a function of an oblique side that connects the opening 30 and the outlet 32 and disproportionally projects toward the inboard side in the vehicle-width direction so as to have a curved horizontal section. In contrast, the left wall 28d extends in the longitudinal direction so as to have a substantially linear horizontal section. The air guide duct 22 is secured to a bulkhead (not illustrated) via a fastening member (not illustrated). The mesh 18 is intended not only to prevent the ingress of dust into the opening 30 in the air guide duct 22, but also to create a visually pleasing appearance.

The opening 30 is formed at a front end of the air guide duct 22 so as to range from the intercooler 26 to the horn 24. In other words, the single opening 30 is formed at a front end of the air guide duct 22 so as to face both the intercooler 26 and the horn 24. As shown in FIG. 3A, a bulging portion 34 bulging rearward toward the horn 24 is formed so as to be located halfway along the right wall 28c. As described later, the bulging portion 34 performs a function not only of a megaphone-shaped portion for the horn 24, but also of a wall surface resistive portion for the air guide duct 22.

As shown in FIGS. 3A and 3B, the bulging portion 34 has a circular opening (bulging portion opening) 36 spaced at a predetermined distance from the horn 24 and a substantially arc-like base 38 that is provided around the circular opening 36 and that extends from the circular opening 36 toward the right wall 28c. The base 38 extending to the right wall 28c is configured to have a larger diameter than the circular opening 36 facing the horn 24. With this arrangement, the entire bulging portion 34 formed by the circular opening 36 and the base 38 is formed in a substantially funnel-like shape. The circular opening 36 performs a function of a horn sounding hole for ensuring that the horn 24 is sounded at an appropriate sound pressure level.

In addition, the width W (see FIG. 3B) of the base 38 between the circular opening 36 and the right wall 28c is set to gradually decrease from a maximum in one circumferential direction and the other circumferential direction and reach a minimum at a portion located across the circular opening 36 in a line going through the maximum portion and the center of the circular opening 36. An inner diameter of the circular opening 36 of the bulging portion 34 is set to be slightly larger than an outer diameter of the substantially disc-like horn 24. Furthermore, the center of the disc-like opening 36 is set to coincide with or substantially coincide with the center of the horn 24.

The horn 24 is a device having a substantially disc-like main body that generates an audible warning sound through a front opening formed in the main body. The horn 24 is disposed behind the bulging portion 34. As shown in FIG. 3A, a circular opening surface 37 of the circular opening 36 of the bulging portion 34 and a front opening surface 39 of the front opening of the horn 24 oppose each other in the longitudinal direction and are substantially parallel to each other in the vehicle-width direction. The horn 24 and the intercooler 26 are juxtaposed to each other in the vehicle-width direction (horizontal direction) so as not to overlap each other. The front opening surface 39 formed in the main body of the horn 24 is disposed so as to be perpendicular to the longitudinal direction (see FIG. 3A). The horn 24 is secured to a vehicle frame via a mounting member (not illustrated).

The substantially box-shaped intercooler 26 is disposed at the outlet 32 of the air guide duct 22 with a predetermined clearance therebetween. The moving air introduced through the bumper opening 16 of the front bumper 12 and the opening 30 of the air guide duct 22 is configured to come into contact with the intercooler 26 via the outlet 32. The intercooler 26 consists of well-known components and has a plurality of fins and tubes (not illustrated) between an inlet and an outlet thereof through which the moving air is introduced during vehicle operation.

Figure 4A:
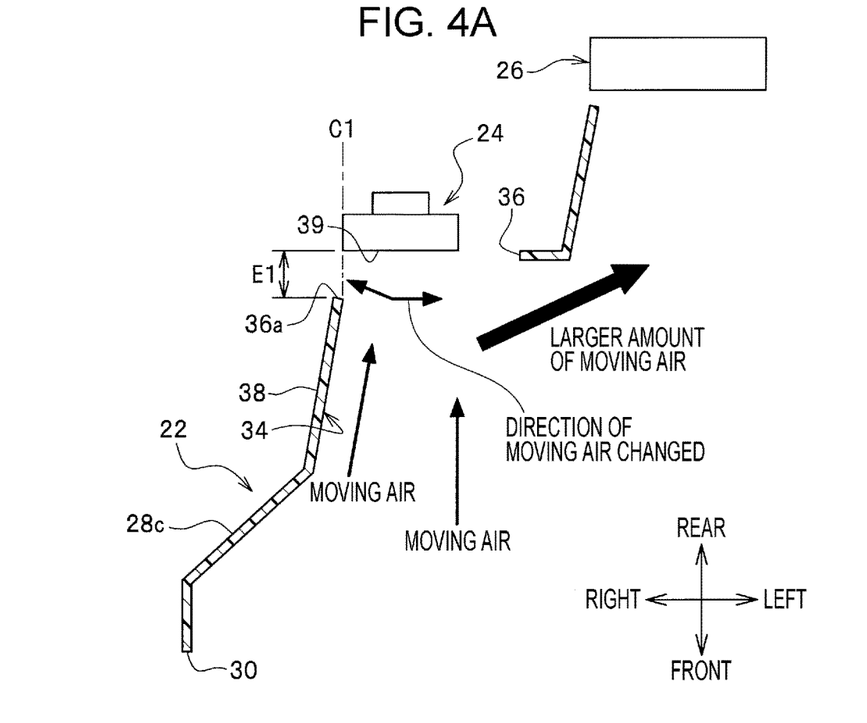
FIG. 4A is a schematic diagram showing how to set a clearance in the first embodiment.
Figure 4B:
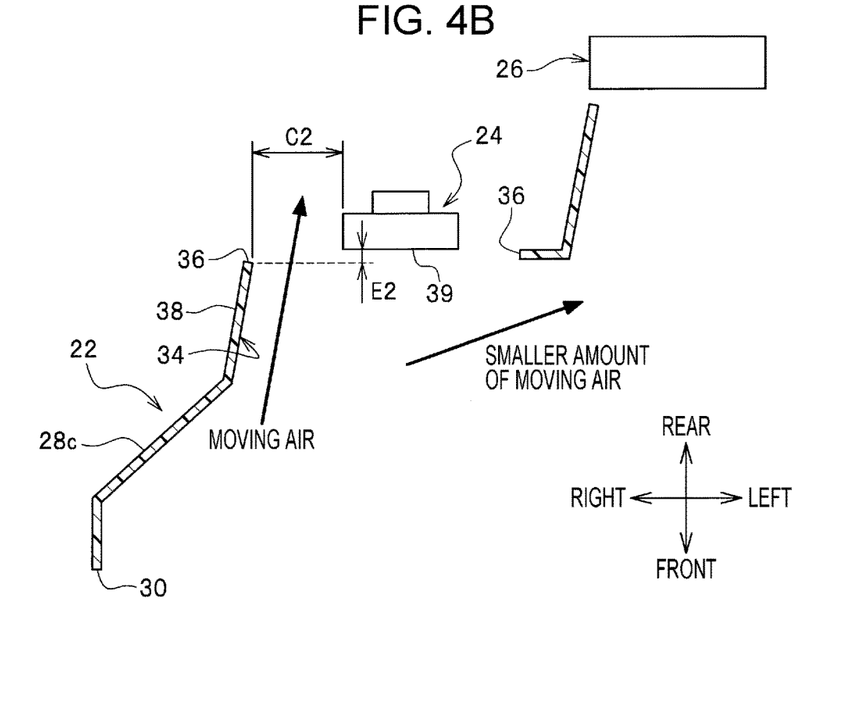
FIG. 4B is a schematic diagram showing how to set a clearance in an example of comparison.

Next, described below are procedures for setting a clearance between the circular opening 36 of the bulging portion 34 and the horn 24 in the air guide duct 22. FIG. 4A is a schematic diagram showing how to set a clearance in the first embodiment. FIG. 4B is a schematic diagram showing how to set a clearance in an example of comparison. The air guide duct 22 and the horn 24 are secured to different components (the air guide duct 22 is mounted on a bulkhead, while the horn 24 is mounted on the vehicle frame), which makes it necessary to consider allowances for these components and avoidance of negative effects resulting from vibrations of the vehicle. This is the reason why such a clearance is required to be set.

As shown in FIG. 4B, in the example of comparison, clearance C2 is set to be larger in the vehicle-width direction, while clearance E2 in the vehicle-width (horizontal) direction between the circular opening 36 of the bulging portion 34 and the front opening surface 39 of the horn 24 is set as close as possible to zero. In the example of comparison, when the vehicle is traveling, the moving air that is introduced through the opening 30 of the air guide duct 22 and that runs along the right wall 28c exits through the larger clearance C2 that is set in the vehicle-width direction between the circular opening 36 and the horn 24. This results in a smaller amount of air flowing toward the intercooler 26, making it difficult to cause the moving air to contribute to the cooling of the intercooler 26.

On the other hand, as shown in FIG. 4A, in the first embodiment, the horn 24 is located close to the right wall 28c in the vehicle-width (horizontal) direction, compared to the example of comparison. As a result, an opening edge 36a located at a right end of the circular opening 36 overlaps (clearance C1=0) or is located as close as possible to a right end of the front opening of the horn 24 (clearance C1≈0) in the vehicle-width (horizontal) direction, while a larger clearance E1 can be created between the circular opening edge 36a of the circular opening 36 and the front opening surface 39 of the horn 24 in the longitudinal direction. Note that clearance C1 is defined as a clearance between the opening edge 36a and the right end of the front opening of the horn 24 in the vehicle-width direction and clearance E1 is defined as a clearance between the opening edge 36a and the front opening surface 39 in the longitudinal direction.

In the first embodiment, the moving air that is introduced through the opening 30 of the air guide duct 22 and that runs along the right wall 28c toward the longitudinal and leftward directions comes into contact with the front face of the horn 24 and is divided into an air stream flowing toward the intercooler 26 and an air stream flowing toward the clearance E1. However, the moving air is running from right to left along the right wall 28c, which results in a smaller amount of air flowing toward the clearance E1. As a result, in the first embodiment, an air stream whose running direction is shifted toward the intercooler 26 is generated, resulting in a greater amount of air flowing toward the intercooler 26 than in the example of comparison, which contributes to the cooling of the intercooler 26.

Figure 5A:
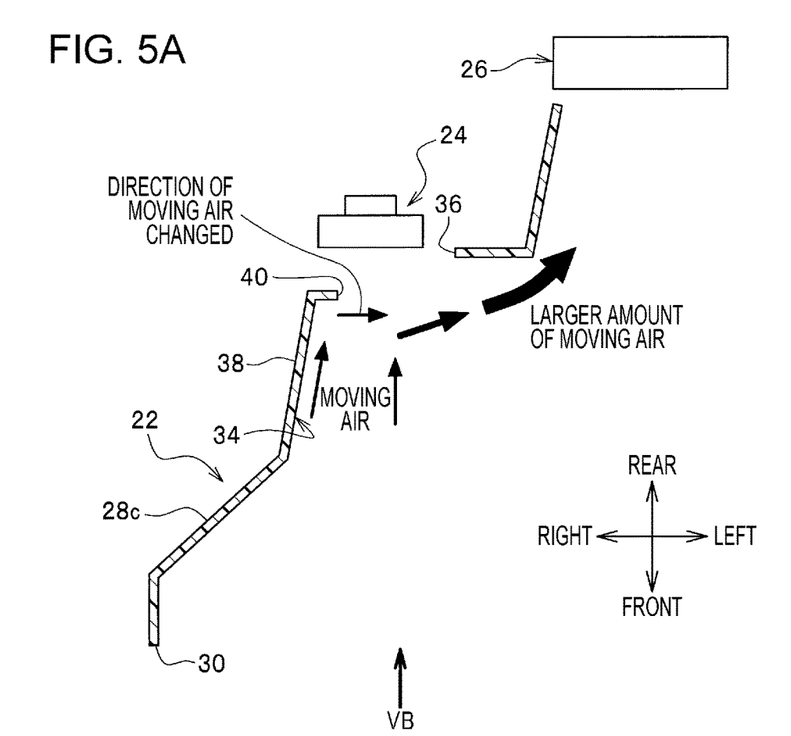
FIG. 5A is a schematic diagram of a vehicle structure according to a second embodiment of the present application that has a lip provided at a circular opening of a bulging portion.
Figure 5B:
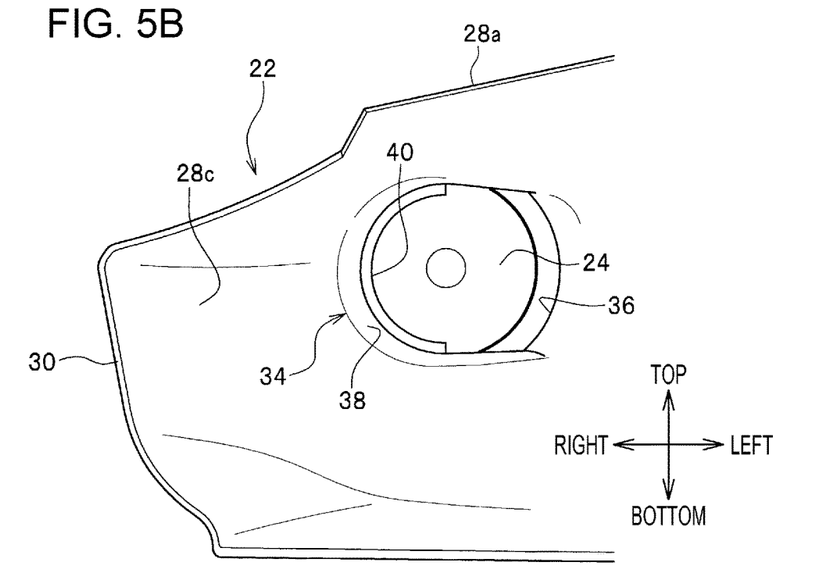
FIG. 5B is a view of a vehicle structure as seen from an arrow "VB" of FIG. 5A.

FIG. 5A is a schematic diagram of a vehicle structure according to a second embodiment of the present application that has a lip provided at a circular opening of the bulging portion. FIG. 5B is a view of the vehicle structure as seen in the direction of an arrow "VB" of FIG. 5A.

In the second embodiment shown in FIG. 5A, a lip 40 projecting slightly outward in the outboard direction is provided at the circular opening 36 of the bulging portion 34. Such a lip 40 is located across the circular opening 36 from the intercooler 26 and is provided substantially halfway (specifically, substantially right-hand halfway in the vehicle-width direction) around the circular opening 36. When the vehicle is traveling, moving air is introduced through the opening 30 of the air guide duct 22 and flows along the right wall 28c. Then, after coming into contact with the lip 40, the direction of the moving air is changed due to the lip 40 and flows toward the intercooler 26. In the second embodiment, the moving air whose flowing direction is shifted toward the intercooler 26 is generated, resulting in a greater amount of air flowing toward the intercooler 26, which contributes to the cooling of the intercooler 26. In the second embodiment, even if a large clearance is set in the longitudinal direction between the circular opening 36 of the bulging portion 34 and the front opening surface 39 of the horn 24, the presence of the lip 40 enables the moving air to be shifted toward the intercooler 26. Note that such a large clearance to be set in the longitudinal direction is not necessarily required. As shown in FIG. 4A, for example, even if a small clearance E1 is set in the longitudinal direction, the lip 40 may be further provided.

In addition, the lip 40 is disposed across the circular opening 36 from the intercooler 26 and is provided substantially halfway around the circular opening 36, whereby the moving air coming into contact with the lip 40 can be effectively changed and at the same time the lip 40 can be easily formed by means of, for example, resin molding or the like. In the second embodiment shown in FIG. 5A, the lip 40 is formed integrally with the base 38 of the bulging portion 34, but is not limited to this. The lip 40 may be formed independently of the base 38.

Figure 6:
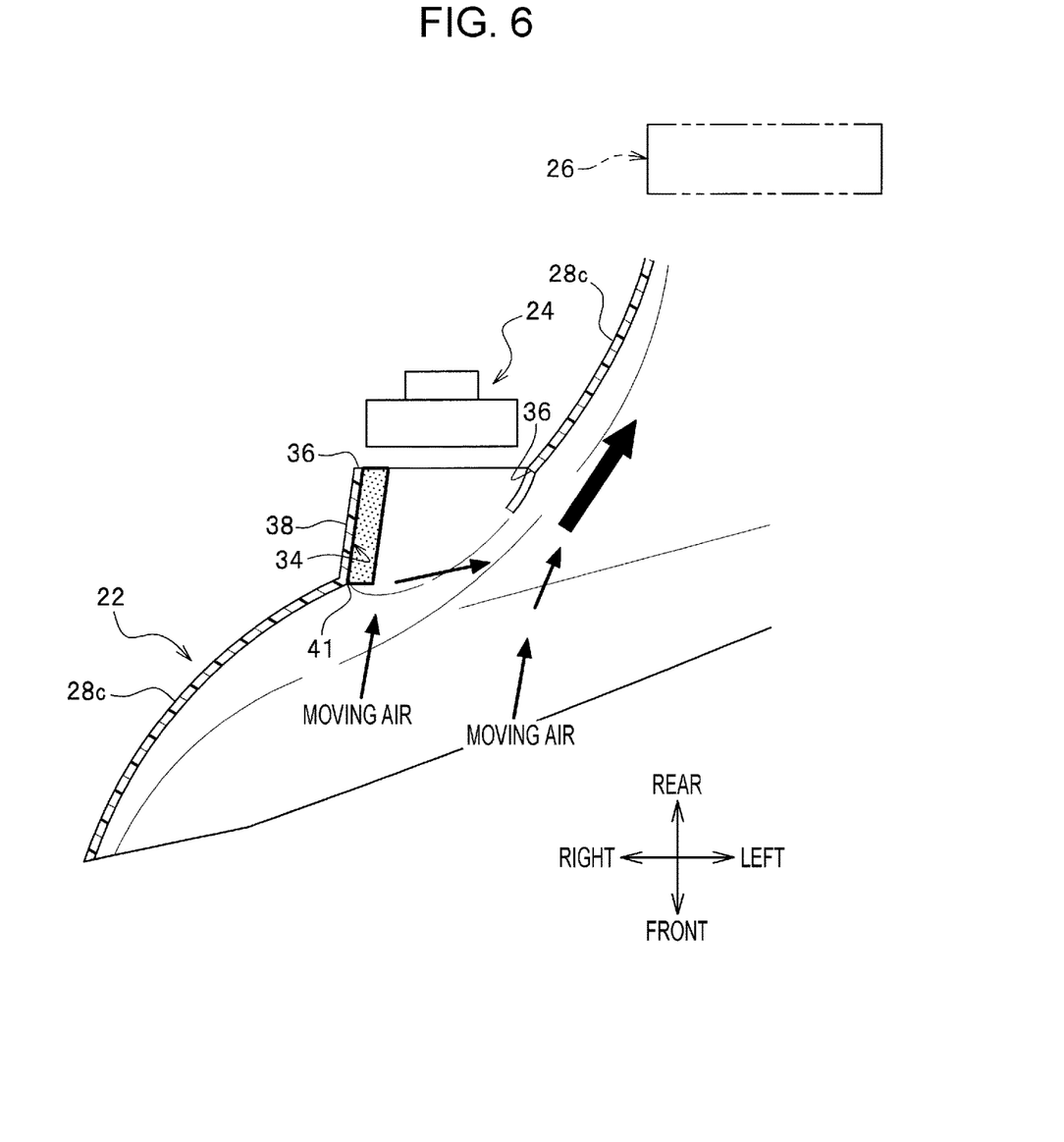
FIG. 6 is a partial transverse sectional view for explaining a bulging portion that performs a function of a wall surface resistive portion.

FIG. 6 is a partial transverse sectional view for explaining a bulging portion that performs a function of a wall surface resistive portion. The base 38 of the bulging portion 34 is formed by bending the right wall 28c of the air guide duct 22 outward (rightward and rearward) at a bent portion 41. For this reason, the base 38 has its inner wall performing a function of resistance (passage resistance) and has the horn 24 located close to the circular opening 36 in such a manner that the circular opening 36 of the bulging portion 34 is substantially blocked by the front opening surface 39 of the front opening of the horn 24. With this arrangement, the base 38 of the bulging portion 34 projecting toward the horn 24 therebehind performs a function of a wall surface resistive portion. In other words, when moving air introduced through the opening 30 of the air guide duct 22 is flowing along the right wall 28c, the flow of some of such moving air in an inner region (indicated by shaded areas in FIG. 6) spanning from the bent portion 41 to the base 38 of the bulging portion 34 is slowed down by the wall surface resistance of the base 38 since the base 38 of the bulging portion 34 projects outward so as to be disposed against the moving air. Pressurized fluids are typically made to flow from their slower stream toward their faster stream. Consequently, rather than flowing to the inner region (indicated by shaded areas in FIG. 6) of the base 38 where the flow of the moving air is slower due to the wall surface resistance of the base 38, the moving air is made to flow toward the faster stream flowing toward the intercooler 26, resulting in a faster and stronger stream (indicated by a thick-line arrow).

In the following description, both the first and second embodiments shown in FIG. 1 through FIGS. 5A and 5B are collectively referred to as "these embodiments". In these embodiments, moving air introduced through the opening 30 of the air guide duct 22 can be transformed into a stronger stream of the moving air mainly flowing toward the intercooler 26 without being interrupted, despite the presence of the inner region (indicated by shaded areas in FIG. 6) of the base 38. This results in a greater amount of the moving air flowing toward the intercooler 26, contributing to the cooling of the intercooler 26.

In these embodiments, the cooling device to be cooled by the moving air is the intercooler 26, for example, but is not limited to this. For example, radiators (not illustrated) or other devices that are cooled by moving air may also be used.

In addition, the air guide member is the air guide duct 22, for example, in these embodiments, but the "duct" is not limited to a tubular body. Furthermore, the air guide duct 22 is not limited to a component whose diameter uniformly decreases from the opening 30 toward the outlet 32 and may include, for example, a component having a stepped shape whose inner diameter gradually decreases and a component having both cylindrically-shaped portions and tapered portions.

Furthermore, in these embodiments, the air guide duct 22, the horn 24, and the intercooler 26 are disposed in the front section of the vehicle, but are not limited to this, and may be disposed in, for example, the rear section of the vehicle, as is the case of a midship car. The phrase "vehicle front section" may include a case in which the air guide duct 22, the horn 24, and the intercooler 26 are disposed in the vehicle rear section.

The vehicle 10 that employs the vehicle structure according to these embodiments has the basic configuration described above. Next, the advantages offered by the vehicle structure are described below.

Figure 7:
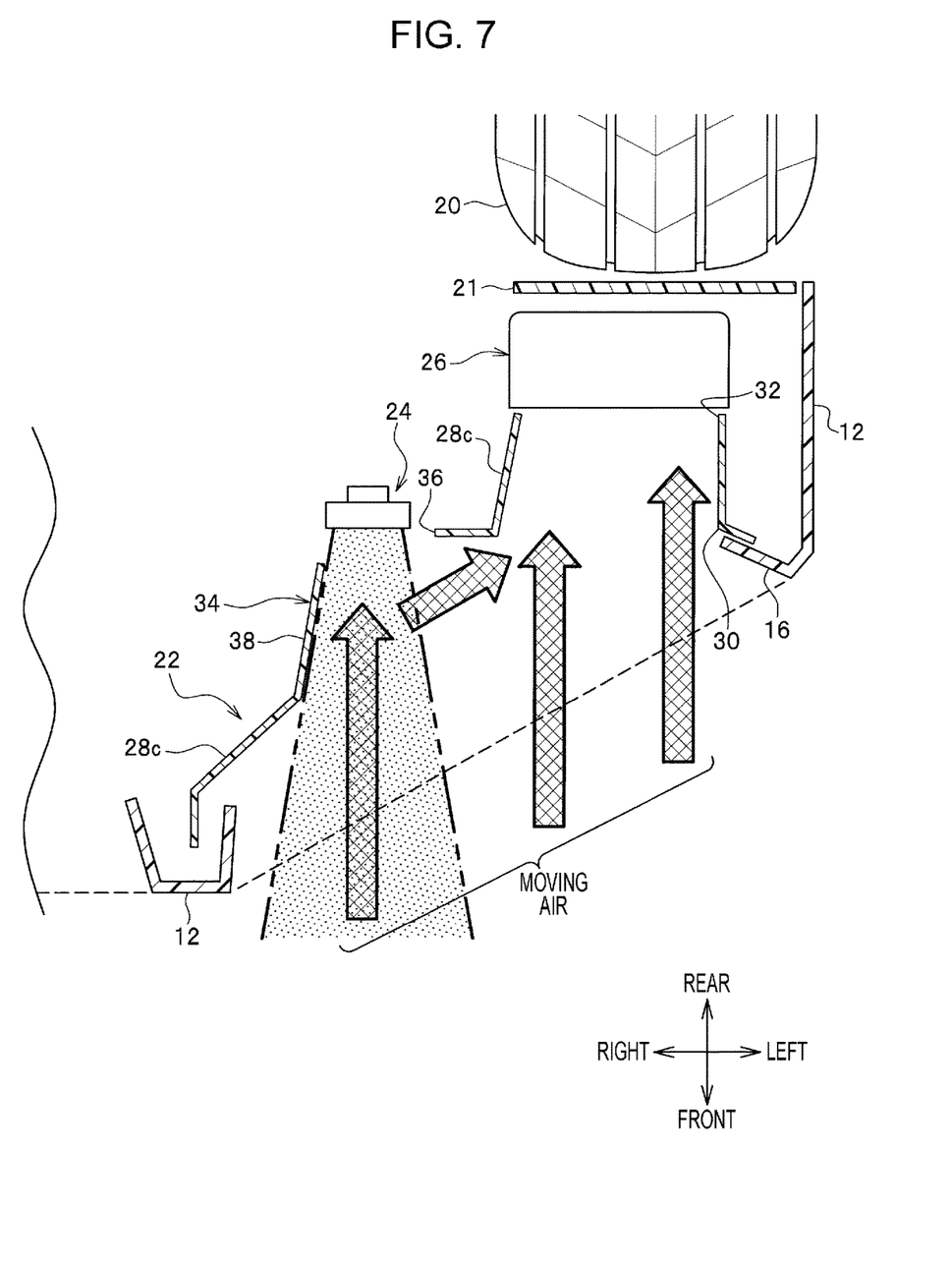
FIG. 7 is a schematic sectional diagram showing a direction of moving air and a sound pressure zone of a horn in first and second embodiments.
Figure 8:
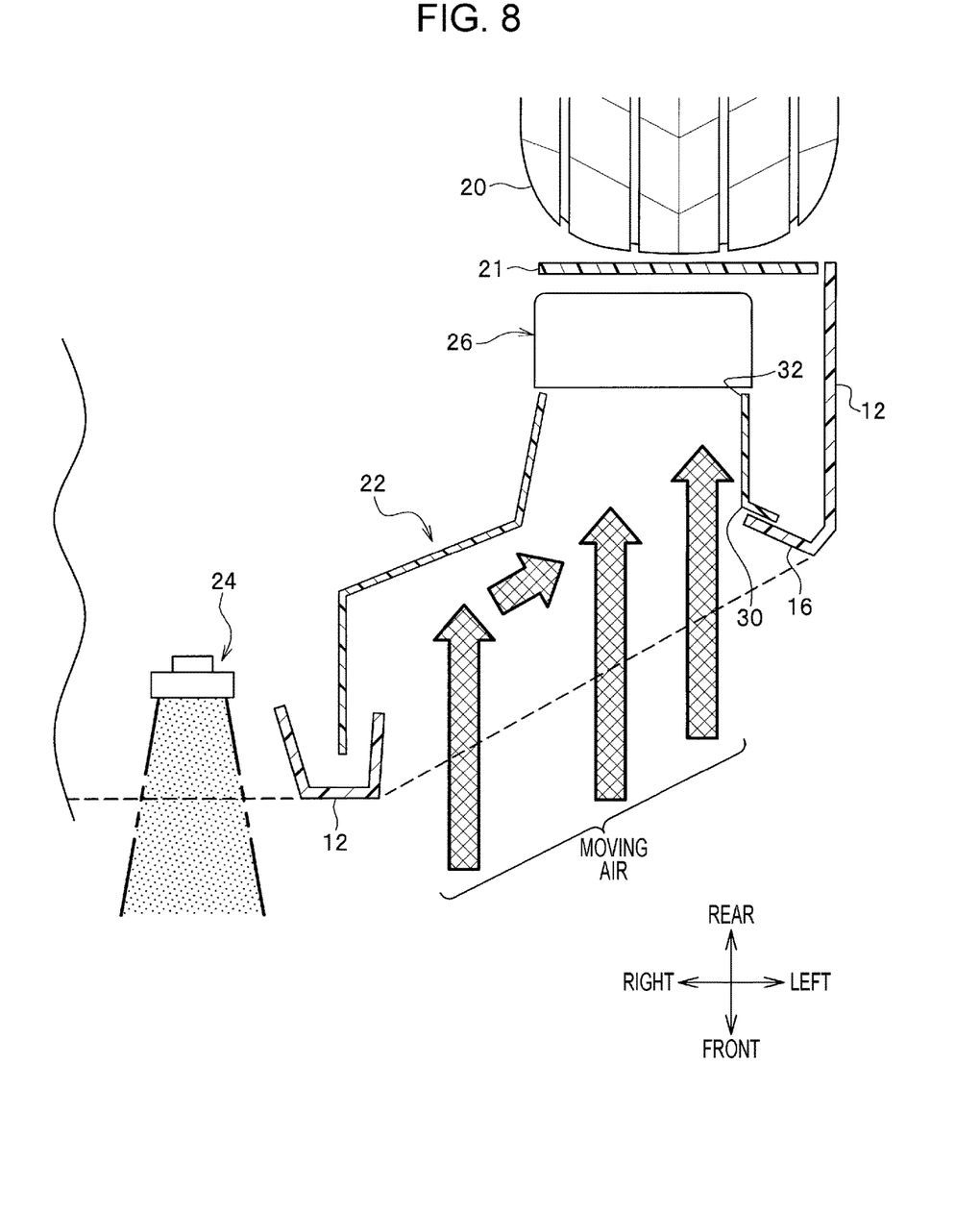
FIG. 8 is a schematic sectional diagram showing a direction of moving air and a sound pressure zone of a horn in an example of comparison in which an air guide duct and a horn are juxtaposed independently of each other.

FIG. 7 is a schematic sectional diagram showing the direction of moving air and the sound pressure zone of the horn in the first and second embodiments. FIG. 8 is a schematic sectional diagram showing the direction of moving air and a sound pressure zone of a horn in the example of comparison in which the air guide duct and the horn are juxtaposed independently of each other. The reference numerals and symbols in FIGS. 7 and 8 refer to the same components as those with the same reference numerals and symbols in FIG. 1 through FIGS. 5A and 5B in the first and second embodiments. FIG. 7 omits the illustration of the lip 40 according to the second embodiment.

As shown in FIG. 8, in the example of comparison in which the air guide duct 22 and the horn 24 are juxtaposed independently of each other, two openings, one for introducing moving air into the intercooler 26 (the bumper opening 16 through the opening 30) and the other for causing the horn 24 to generate sound pressure, are required to be provided independently of each other. This makes it impossible to make efficient use of space in a narrow space like that of an engine compartment in the front section of the vehicle.

In addition, in the example of comparison, the horn 24 and the intercooler 26 need to be disposed in different spaces, which requires large spaces in the vehicle-width direction, including, for example, a space for the horn 24 and a space for the intercooler 26.

Furthermore, if an opening area of the air guide duct 22 is enlarged to improve the cooling capability of the intercooler 26 in the example of comparison, the opening of the air guide duct 22 interferes with the sound pressure zone (indicated by shaded areas) of the horn 24, making it impossible for the horn 24 to maintain an appropriate sound pressure level. For this reason, it is impossible to enlarge the opening area of the intercooler 26 in the example of comparison.

On the contrary, in these embodiments, the intercooler 26 and the horn 24 are juxtaposed in the vehicle-width direction and the opening 30 spanning from the intercooler 26 and the horn 24 is provided in the front of the vehicle, whereby moving air can be guided through the opening 30 of the aid guide duct 22 into the intercooler 26 in a preferred manner and the opening 30 does not impede the transmission of an audible warning sound emitted from the horn 24, enabling the opening 30 and the horn 24 to coexist in harmony. Consequently, in these embodiments, the opening 30 spanning from the intercooler 26 and the horn 24 is able to not only enhance both the air guide capability of the air guide duct 22 and the amplifying capability of the horn 24, but also harmonize the air guide capability with the amplifying capability.

In other words, the single opening 30 facing both the intercooler 26 and the horn 24 is formed in the front of the vehicle whereby the improved cooling capability of the intercooler 26 due to a greater amount of moving air introduced through the opening 30 and the establishment of an appropriate sound pressure level of the horn 24 can coexist in harmony without interfering with each other.

In these embodiments, the substantially funnel-like right wall 28c whose outlet 32 has a smaller diameter than the opening 30 is provided and the horn 24 is disposed halfway along the right wall 28c, whereby the right wall 28c can perform a function of a megaphone-shaped portion for the horn 24. In addition, the bulging portion 34 is formed by causing part of the right wall 28c to form a bulge outward (rightward and rearward) at a portion halfway along the right wall 28c, whereby the base 38 of the bulging portion 34 performs a function of wall surface resistance, which causes moving air to flow toward the intercooler 26, rather than flowing toward the horn 24. Furthermore, the bulging portion 34 has a simplified structure consisting of the circular opening 36 and the base 38 whereby the bulging portion 34 can be easily formed by molding integrally with the air guide duct 22. Furthermore, in these embodiments, a hole (namely, the circular opening 36) for causing the horn 24 to generate sound pressure is formed in the air guide duct 22 and the bulging portion 34 itself as a megaphone-shaped portion performs a function of amplifying an audible warning sound, thereby enabling the horn 24 to generate an appropriate sound pressure level.

In addition, the space for disposing the horn and the sound pressure zone shown in the example of comparison are not required in the vehicle-width direction in these embodiments, whereby an opening area of the air guide duct 22 can be increased by the space for disposing the horn and the sound pressure zone. Consequently, in these embodiments, the increased opening area of the air guide duct 22 results in a greater amount of moving air introduced into the intercooler 26, thereby improving the cooling capability.

Furthermore, in these embodiments, the sound pressure zone (indicated by shaded areas in FIG. 7) for the horn 24 is set in the air guide duct 22 and there is no obstacle that interferes with the transmission of sound from the horn 24 whereby the sound transmission capability of the horn 24 can be enhanced.

Furthermore, in these embodiments, the bulging portion 34 of the air guide duct 22 performs a function of a megaphone-shaped portion and the entire air guide duct 22 also performs a function of amplification equipment for amplifying an audible warning sound from the horn 24, thereby further improving the amplification capability of the horn 24.

Furthermore, in these embodiments, the horn 24 is disposed so as to face the vehicle front to establish an appropriate sound pressure level at the vehicle front, but, on the condition that an appropriate sound pressure level is established, the horn 24 may be inclined downward from, for example, the intercooler 26 toward its opposite side in order to further increase the amount of moving air flowing toward the intercooler 26.

Furthermore, in these embodiments, a greater amount of moving air is configured to flow toward the intercooler 26 compared to the example of comparison, but, due to an increase in volume of air resulting from such a greater amount of moving air being introduced, an opening area of the bumper opening 16 can be reduced through the proper setting of the amount of moving air. A reduced opening area of the bumper opening 16 improves the aerodynamic characteristics of the vehicle, whereby the fuel economy and maximum speed of the vehicle can be improved.

Furthermore, in these embodiments, moving air coming into contact with the horn 24 is used to generate moving air flowing toward the intercooler 26, but the flow speed of the moving air is controlled by retarding the moving air coming into contact with the horn 24, whereby the separation of the moving air from the right wall 28c can be reduced to equalize (substantially homogenize) the moving air introduced into the inlet of the intercooler 26.

Figure 9A:
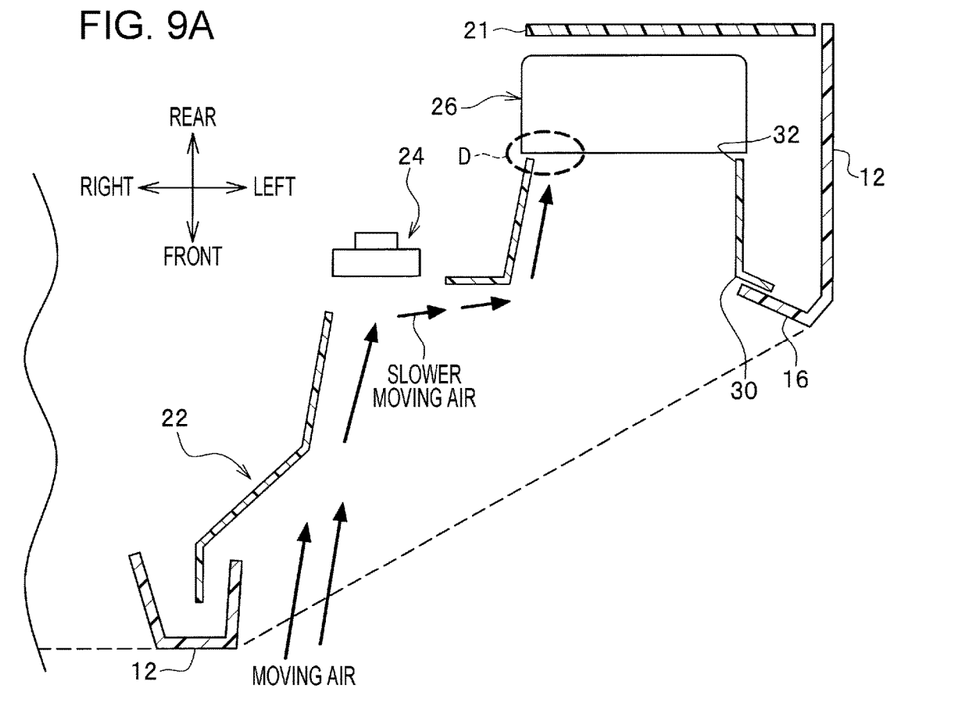
FIG. 9A is an explanatory diagram showing a flow of moving air in a first embodiment.
Figure 9B:
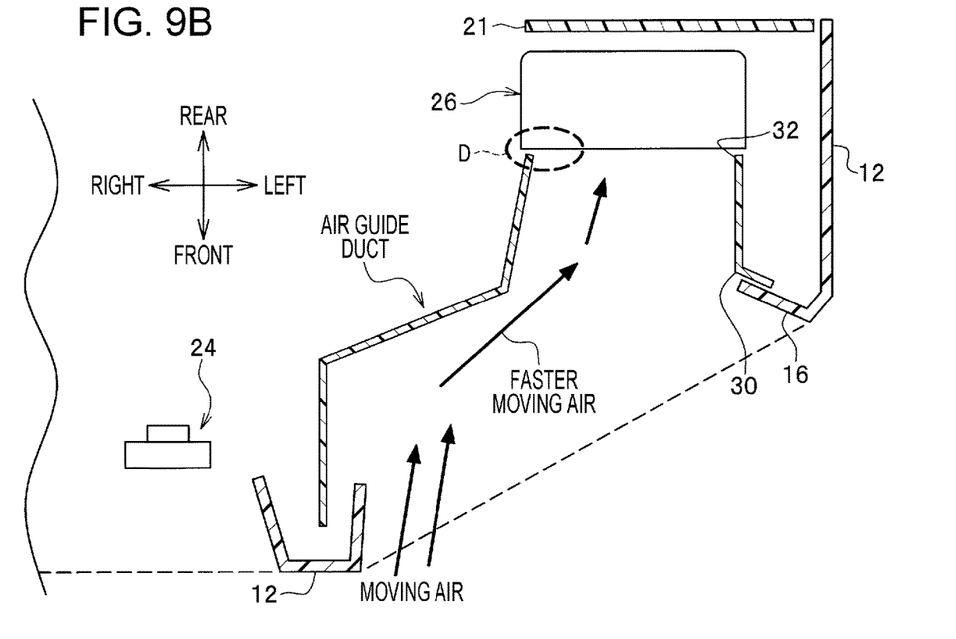
FIG. 9B is an explanatory diagram showing a flow of moving air in an example of comparison in which a horn is disposed outside an air guide duct.

FIG. 9A is an explanatory diagram showing a flow of moving air in the first embodiment. FIG. 9B is an explanatory diagram showing a flow of moving air in the example of comparison in which the horn is disposed outside the air guide duct.

In the example of comparison shown in FIG. 9B, there is no moving air coming into contact with the horn 24 which results in an increased flow speed of the moving air. As a result, the moving air is separated from the right wall 28c, making it impossible to introduce the moving air into an inner region D extending in the vehicle-width direction of the intercooler 26. On the contrary, in the first embodiment shown in FIG. 9A, the moving air is retarded after coming into contact with the horn 24, thereby enabling the moving air to be introduced into the inner region D in the vehicle-width direction of the intercooler 26. Thus, in the first embodiment, the moving air introduced into the inlet of the intercooler 26 can be successfully equalized, unlike in the example of comparison.

Figure 10:
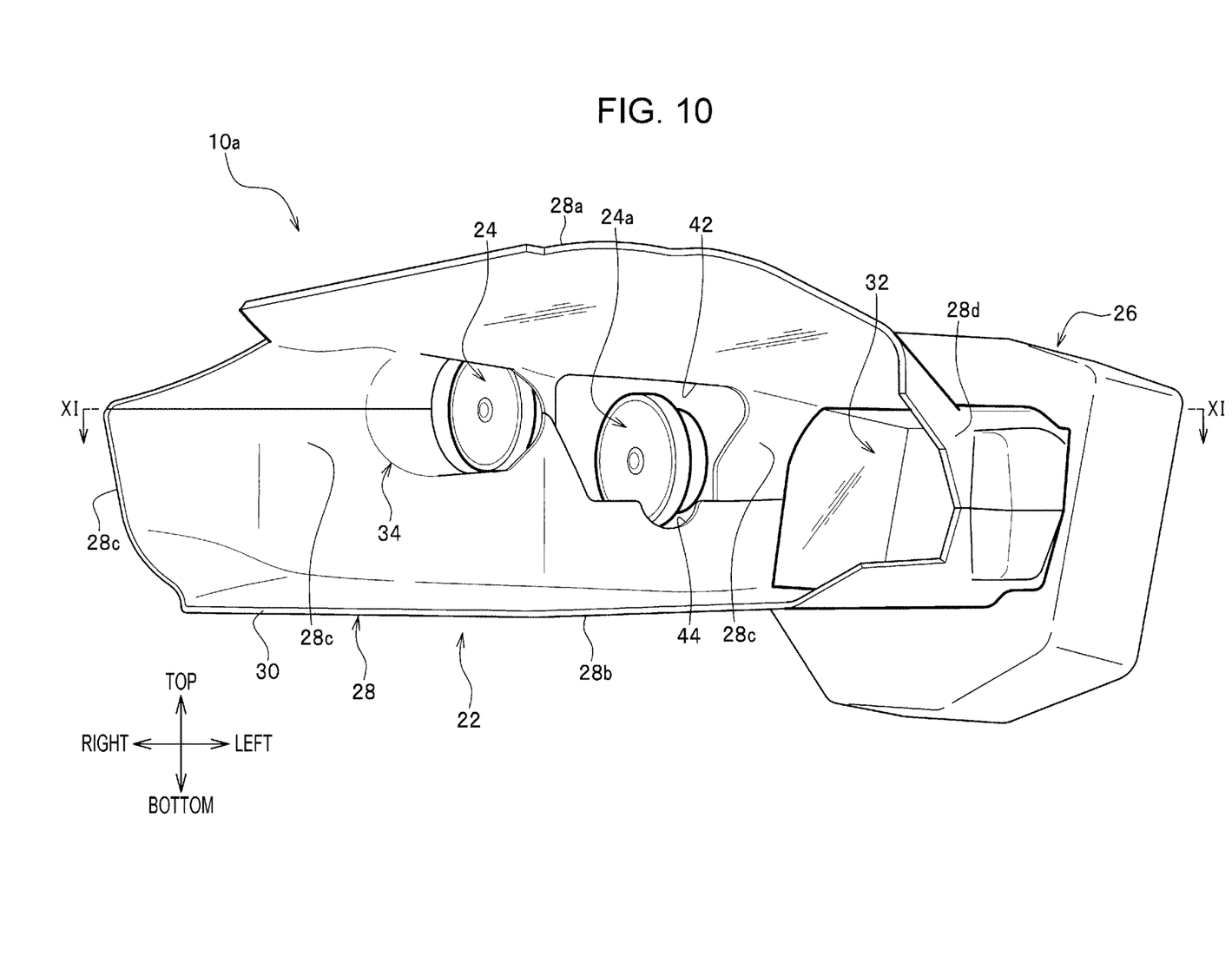
FIG. 10 is a perspective view of a left front portion of a vehicle that employs a vehicle structure according to a third embodiment of the present application from which illustrations of a front bumper and a mesh are removed.
Figure 11:
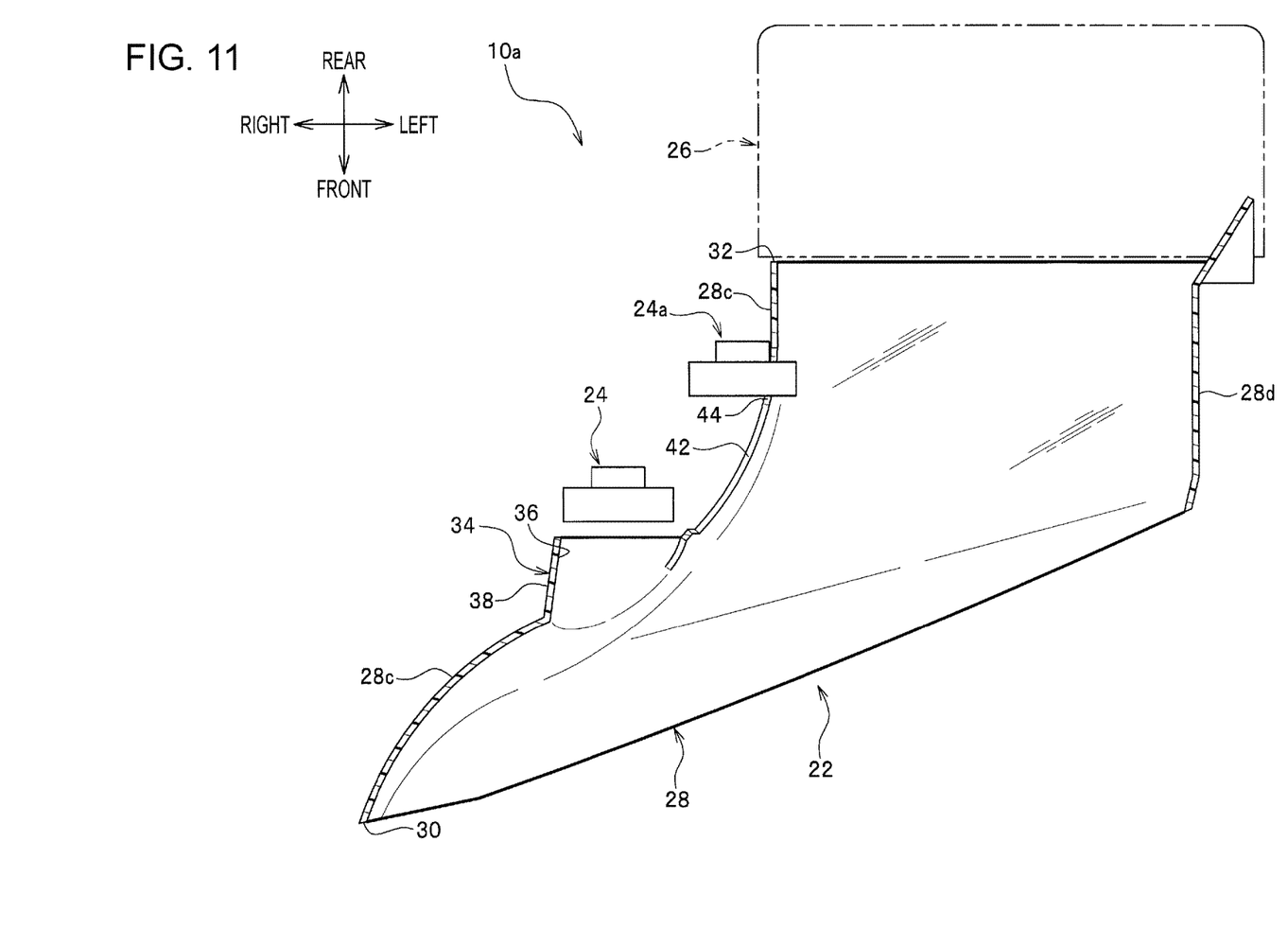
FIG. 11 is a transverse sectional view taken along line XI-XI of FIG. 10.
Figure 12:
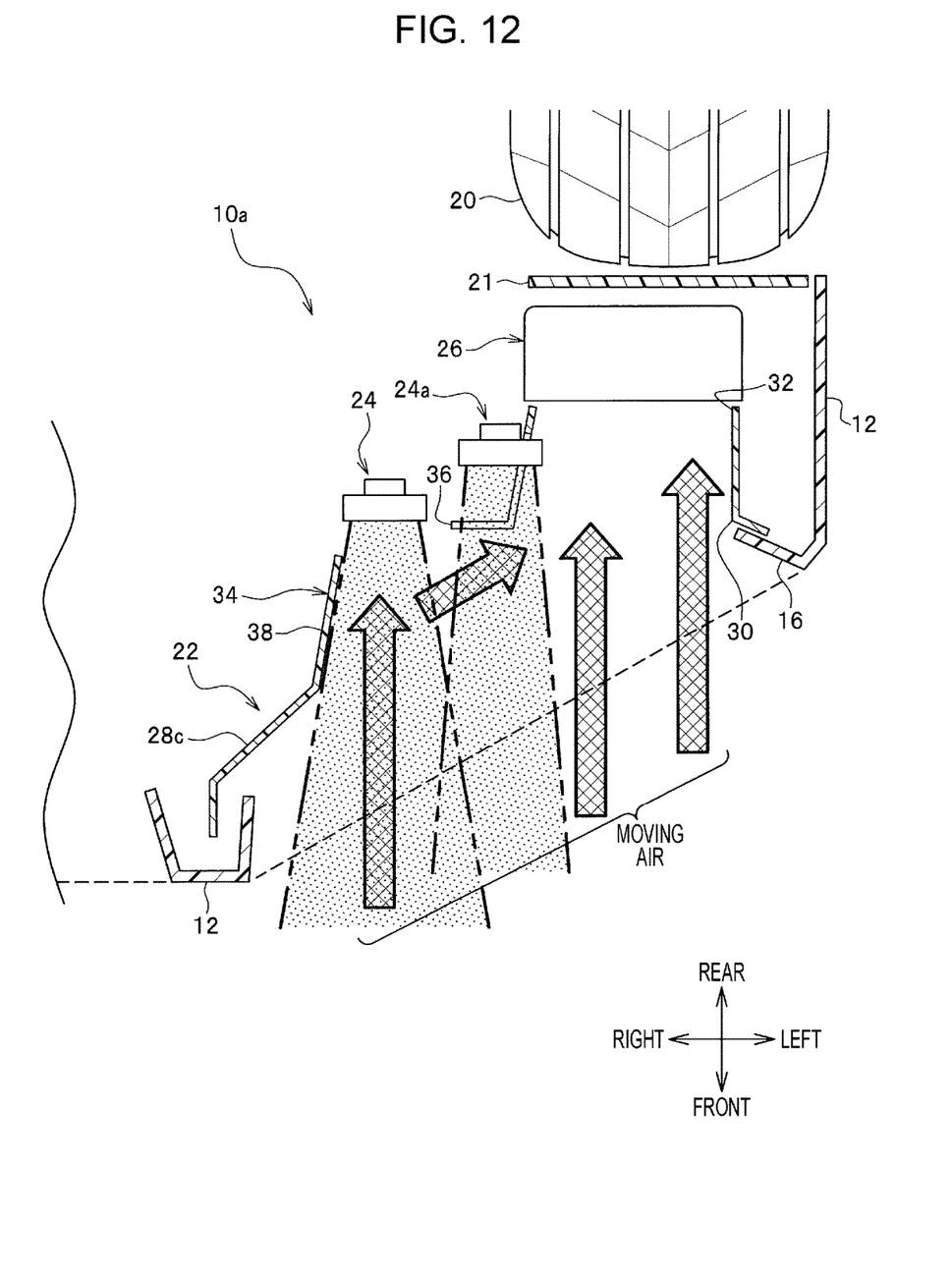
FIG. 12 is a schematic sectional diagram showing a direction of moving air and a sound pressure/tone zone of a horn in a third embodiment.

Next, a vehicle structure according to a third embodiment of the present application will be described below. FIG. 10 is a perspective view of a left front portion of a vehicle 10a that employs the vehicle structure according to the third embodiment of the present application from which illustrations of a front bumper and a mesh are removed. FIG. 11 is a transverse sectional view taken along like XI-XI of FIG 10. FIG. 12 is a schematic sectional diagram showing adirection of moving air and a sound pressure/tone zone of the horn in the third embodiment. The reference numbers and symbols in the third embodiment refer to the same components as those with the same reference numerals and symbols in the first and second embodiments, and repeated descriptions of the same components are omitted.

In the third embodiment, the first horn 24 for establishing a sound pressure level and a second horn 24a for creating the tone of a warning sound are provided, although the single horn 24 is provided in the first embodiment shown in FIG. 1 through FIGS. 3A and 3B. The second horn 24a is disposed so as to be located on the outboard side of and behind the first horn 24. Like the first horn 24, the second horn 24a is secured to a vehicle frame via a mounting member (not illustrated).

The right wall 28c of the air guide duct 22 has a cutout 42 for enabling part of the second horn 24a to be disposed inside the air guide duct 22. The cutout 42 has an arc-like cutout 44 having a substantially semicircular section formed in a lower portion thereof.

In the third embodiment, even if the intercooler 26, the first horn 24, and the second horn 24a are juxtaposed in the vehicle-width direction, the opening 30 spanning from the intercooler 26 to the first horn 24 to the second horn 24a in the front of the vehicle 10a is able to not only enhance both the air guide capability of the air guide duct 22 and the amplifying capability of the first horn 24, but also harmonize the air guide capability with the amplifying capability.

In the third embodiment, even if the two horns, including the first horn 24 and the second horn 24a, are disposed, the cooling efficiency of the intercooler 26 can be enhanced by enlarging the opening 30 of the air guide duct 22.

In addition, in the third embodiment, the cutout 42 formed in the right wall 28c of the air guide duct 22 prevents the second horn 24a from becoming an obstacle, thereby enabling the entire air guide duct 22 to perform a function of a megaphone-shaped portion or amplifying equipment.

Other advantages are the same as those of the first and second embodiments, and their detailed descriptions are omitted.

A first aspect of the present application provides a vehicle structure which includes a cooling device that is cooled by moving air received by a vehicle while traveling, an air guide member that guides the moving air into the cooling device, and a horn disposed at the side of the air guide member, in which the cooling device and the horn are juxtaposed in the vehicle-width direction and in which the air guide member has a single opening in the front of the vehicle, the opening spanning from the cooling device to the horn.

The cooling device and the horn are juxtaposed in the vehicle-width direction and the opening spanning from the cooling device and the horn is provided in the front of the vehicle, whereby moving air can be guided through the opening of the aid guide duct into the cooling device in a preferred manner and the opening does not impede the transmission of an audible warning sound emitted from the horn to the outside. Consequently, the opening spanning from the cooling device and the horn is able to not only enhance both the air guide capability of the air guide member and the amplifying capability of the horn, but also harmonize the air guide capability with the amplifying capability.

In other words, the single opening facing both the cooling device and the horn that are juxtaposed in the vehicle-width direction is formed in the front of the vehicle whereby the improved cooling capability of the cooling device due to a greater amount of moving air introduced through the opening and the establishment of an appropriate sound pressure level of the horn can coexist in harmony without interfering with each other.

A second aspect of the present application provides a vehicle structure in which the air guide member may have an outlet that is located close to the cooling device and that has a smaller diameter than the opening and an oblique side that connects the opening and the outlet and in which the horn may be disposed halfway along the oblique side.

The substantially funnel-like oblique side whose outlet has a smaller diameter than the opening is provided and the horn is disposed halfway along the oblique side, whereby the oblique side can perform a function of a megaphone-shaped portion for the horn.

A third aspect of the present application provides a vehicle structure in which a bulging portion may be provided halfway along the oblique side so as to form a bulge toward the horn located outside the air guide member and in which the bulging portion may have a bulging portion opening that faces the horn located therebehind and a base extending from the bulging portion opening to the air guide member.

The bulging portion is provided halfway along the oblique side so as to form a bulge toward the horn located outside the air guide member, whereby, when moving air introduced through the opening runs along the oblique side, the base of the bulging portion performs a function of wall surface resistance, which causes the moving air to flow toward the cooling device, rather than flowing toward the horn. In addition, the bulging portion has a simplified structure consisting of a bulging portion opening and the base whereby the bulging portion can be easily formed by being integrally molded with the air guide member.

A fourth aspect of the present application provides a vehicle rear structure in which at least part of an opening edge of the bulging portion opening may overlap the horn in the vehicle-width direction.

At least part of an opening edge of the bulging portion opening overlaps the horn in the vehicle-width direction whereby the amount of the moving air flowing toward the cooling device can be increased, compared to the case where, for example, a greater clearance is provided in the vehicle-width direction between the opening edge of the bulging portion opening and the horn.

A fifth aspect of the present application provides a vehicle structure in which the bulging portion opening may have a lip projecting toward the center thereof.

The lip is provided at the bulging portion opening whereby the direction of the moving air can be changed so that a stream of the moving air flowing toward the cooling device can be increased.

A sixth aspect of the present application provides a vehicle structure in which the lip may be provided substantially halfway around the bulging portion opening so as to be located across the bulging portion opening from the cooling device in the vehicle-width direction.

The lip is provided substantially halfway around the bulging portion opening so as to be located across the bulging portion opening from the cooling device in the vehicle-width direction, thereby effectively changing the moving air coming into contact with the lip and enabling the lip to be easily formed by means of, for example, resin molding or the like.

The present application provides a vehicle structure that is able to not only enhance an air guide capability of an air guide member and an amplifying capability of a horn, but also harmonize the air guide capability with the amplifying capability.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle structure comprising:
a cooling device that is cooled by a flow of moving air which a vehicle receives while traveling;
an air guide member that guides the moving air into the cooling device; and
a horn disposed at the side of the air guide member,
wherein the cooling device and the horn are juxtaposed in the vehicle-width direction; and
wherein the air guide member has a single opening in the front of the vehicle, the opening spanning from the cooling device to the horn.

2. The vehicle structure according to claim 1,
wherein the air guide member has an outlet that is located close to the cooling device and that has a smaller diameter than the opening and an oblique side that connects the opening and the outlet; and
wherein the horn is disposed halfway along the oblique side.

3. The vehicle structure according to claim 2,
wherein a bulging portion is provided halfway along the oblique side so as to form a bulge toward the horn located outside the air guide member; and
wherein the bulging portion has a bulging portion opening that faces the horn located therebehind and a base extending from the bulging portion opening to the air guide member.

4. The vehicle structure according to claim 3,
wherein at least part of an opening edge of the bulging portion opening is configured to overlap the horn in the vehicle-width direction.

5. The vehicle structure according to claim 3,
wherein the bulging portion opening has a lip projecting toward the center thereof.

6. The vehicle structure according to claim 5,
wherein the lip is provided substantially halfway around the bulging portion opening so as to be located across the bulging portion opening from the cooling device in the vehicle-width direction.

7. A vehicle structure comprising:
a cooling device to be cooled with a flow of moving air which a vehicle receives while traveling;
an air guide member to guide the moving air into the cooling device, the air guide member having a single opening in a front of the vehicle; and
a horn disposed at a side of the air guide member, the cooling device and the horn being arranged in a vehicle-width direction, the cooling device and the horn facing the single opening viewed form the front of the vehicle.

8. The vehicle structure according to claim 7,
wherein the air guide member has an outlet that is located close to the cooling device and that has a smaller diameter than the opening and an oblique side that connects the opening and the outlet; and
wherein the horn is disposed halfway along the oblique side.

9. The vehicle structure according to claim 8,
wherein a bulging portion is provided halfway along the oblique side so as to form a bulge toward the horn located outside the air guide member; and
wherein the bulging portion has a bulging portion opening that faces the horn located therebehind and a base extending from the bulging portion opening to the air guide member.

10. The vehicle structure according to claim 9,
wherein at least part of an opening edge of the bulging portion opening is configured to overlap the horn in the vehicle-width direction.

11. The vehicle structure according to claim 9,
wherein the bulging portion opening has a lip projecting toward the center thereof.

12. The vehicle structure according to claim 11,
wherein the lip is provided substantially halfway around the bulging portion opening so as to be located across the bulging portion opening from the cooling device in the vehicle-width direction.

* * * * *